United States Patent [19]

Sakamoto et al.

[11] Patent Number: 4,746,467
[45] Date of Patent: May 24, 1988

[54] PROCESS FOR PRODUCING MICROCAPSULES

[75] Inventors: Masahiro Sakamoto; Sadao Takahashi, both of Oiso, Japan

[73] Assignee: Jujo Paper Co., Ltd., Tokyo, Japan

[21] Appl. No.: 873,585

[22] Filed: Jun. 12, 1986

[30] Foreign Application Priority Data

Jul. 17, 1985 [JP] Japan ................... 60-156042

[51] Int. Cl.$^4$ .............................................. B01J 13/02
[52] U.S. Cl. .................. 264/4.7; 428/402.21; 428/914; 503/215
[58] Field of Search ............... 264/4.7; 428/402.21; 346/215; 503/215

[56] References Cited

U.S. PATENT DOCUMENTS

| 4,251,386 | 2/1981 | Saeki et al. | 264/4.7 |
| 4,353,809 | 10/1982 | Hoshi et al. | 346/215 X |
| 4,409,156 | 10/1983 | Hoshi et al. | 428/402.21 X |
| 4,450,123 | 5/1984 | Egawa et al. | 428/402.21 X |

*Primary Examiner*—Richard D. Lovering
*Attorney, Agent, or Firm*—Koda and Androlia

[57] ABSTRACT

The process for producing microcapsules comprises forming capsules having a wall film composed of an amine-aldehyde polycondensate in a system in which a hydrophobic core substance is dispersed or emulsified in an acid aqueous solution containing an anionic colloidal substance, said anionic colloidal substance being an anionic water-soluble copolymer composed of acrylic acid, styrenesulfonic acid, and alkyl acrylate or alkyl methacrylate. The present invention decreases the large particles present in the capsule slurry, and provides microcapsule which are excellent in emulsification power, emulsification stability, particle size distribution, impermeability of capsule-wall film and workability.

10 Claims, No Drawings

PROCESS FOR PRODUCING MICROCAPSULES

BACKGROUND OF THE INVENTION

1. Field of the Invention

The present invention relates to a process for producing mirocapsules which use amino-aldehyde resin as a microcapsule wall and are used for changing or controlling various properties of substances in such a field as pharmaceuticals, agricultural chemicals, perfumes, dyestuffs etc., specifically for producing pressure-sensitive recording sheets.

2. Prior Art

The encapsulating methods can be divided into a mechanical method, physical method, physicochemical method, chemical method, and methods based upon combination of these.

The present invention relates to an in-situ polymerization method in which the capsule-forming reaction starts from the continuous phase. Further, the capsule-forming reaction of the present invention is carried out in the presence of an anionic water-soluble copolymer.

Use of amine/formaldehyde polycondensate or urea/formaldehyde polycondensate for forming the wall film has already been disclosed in, for example, Japanese Patent Publication Nos. 12380/1962, 3495/1969, and 23165/1972. With these methods, it is difficult to efficiently and stably deposit the polycondensate around the hydrophobic core material, or the emulsification or dispersion is not efficiently performed.

In order to improve the above-mentioned defects, Japanese Patent Publication No. 16949/1979 proposes to use, as the anionic high-molecular electrolyte, a polyethylene/maleic anhydride, polyacrylic acid, polymethyl vinyl ether/maleic anhydride, and the like. This method improves the emulsification and dispersion properties and the depositing efficiency of the polycondensate around the core material, but provides as a defect the resulting capsule slurry having an undesirably high viscosity. The combined use of a copolyer of styrene/maleic anhydride and a copolymer of vinyl acetate/maleic anhydride has been disclosed in Japanese Patent Laid-Open No. 47139/1980, the use of an anionic polymer of vinylbenzene sulfonic acid type in Japanese Patent Laid-Open No. 51238/1981, the use of polymer or copolymer containing a sulfo group in Japanese Patent Laid-Open No. 58536/1981.

In the process using melamine-formaldehyde polycondensate or urea-formaldehyde polycondensate as a capsule wall, further, there have been disclosed the use of an anionic water-soluble copolymer containing of at least these monomers including acrylic acid, hydrooxyalkyl acrylate or hydrooxyalkyl methacrylate and styrenesulfonic acid in Japanese Patent Laid-Open No. 14942/1983, the combined use of an acrylic acid copolymer and a styrenesulfonic acid copolymer in Japanese Patent Laid-Open No. 142836/1984, the use of a copolymer of acrylic acid, acrylonitrile, acrylic amide alkyl sulfonate and acrylic acid sulfoalkyl ester in Japanese patent Laid-Open No 28819/1985, and the use of acrylic acid and alkyl acrylate in Japanese Patent Laid-Open No. 58045/1985.

The above-described methods have following defects to be improved. In Japanese Patent Laid-Open No. 47139/1980, the solubility of styrene-maleic anhydride copolyer is insufficient when the pH is smaller than 4; in Japanese Patent Laid-Open No. 51238/1981, the production of a dense capsule wall is difficult, a large quantity of foam is formed, which makes the workability of the capsule production difficult in the use of a vinylbenzene-sulfonic acid-type polymer for preparing a capsule wall film composed of urea-formaldehyde polycondensate.

In Japanese Patent Laid-Open Nos. 14942/1982, 14283/1984 and 68045/1985, it is disclosed that good slurries can be obtained with high concentration, low viscosities and particle size distribution of capsules. However, there is the disadvantage that in their use for pressure-sensitive recording sheets, spots appear on the surface of these sheets. In self-coloring type pressure-sensitive recording paper, the spots appear markedly. This is thought to be due to large particles and coagulated product slightly present in a capsule slurry. If a surfactant is used to remove them, there arises a new problem that the wall film impermeability of a capsule and the coloring property are deteriorated. In the use of the copolymer disclosed in Japanese Patent Laid-Open No 68045/1985, the emulsification property and emulsification stability are improved without fail. However, there is room for improvements with regard to the spots and the viscosity increase of the copolymer itself with the lapse of time.

SUMMARY OF THE INVENTION

As is apparent from the above description, it is an object to improve a process for producing a microcapsule by the in-situ polymerization method wherein a microcapsule wall film composed of an aminealdehyde polycondensate is formed by the reaction from only one side of the continuous plase. Namely, it is the object to decrease the large particles slightly present in the capsule slurry, thereby decreasing the spots even in the use of the microcapsules for pressure-sensitive recording paper.

It is an another object of the present invention to provide a process for producing microcapsules being excellent in emulsification power, emulsification stability during the encapsulating reaction, particle size distribution, impermeability of its wall film and workability.

The above object may be performed by adopting a process for producing microcapsules which comprise forming capsules having a wall film composed of an amine-aldehyde polycondensate in a system in which a hydrophobic core substance is dispersed or emulsified in an acid aqueous solution containing an anionic colloidal substance, said anionic colloidal substance being an anionic water-solube copolymer composed of three monomers, namely acrylic acid, styrenesulfonic acid, and alkyl acrylate or alkyl methacrylate.

DETAILED DESCRIPTION OF THE INVENTION

A preferred method of obtaining the anionic water-soluble copolymer of the present invention is the radial polymerization method, a general acrylic acid polymerization method. Namely, the method comprises placing a mixture of the aforesaid three monomers in a vessel, preparing their water solution with an appropriate concentration, replacing the air in the vessel with nitrogen gas, adding an organic in inorganic peroxide or persulfate, and applying heat to thereby carry out the polymerization reaction. After the completion of the reaction, a part of the resultant copolymer may be neutralized with an alkali, such as caustic soda or the like, if desired.

The copolymer radical polymerized in a water system is generally obtained as a water solution containing 5 to 30% by weight of nonvolatile components. This copolymer, unlike a maleic acid-based copolymer, requires no dissolution procedure, thereby simplifying the encapsulating operation.

Preferably, the composition of monomers of the anionic colloidal material used in the present invention consists of 73 to 92% by weight of acrylic acid, 2.5 to 17% by weight of styrenesulfonic acid and 2.5 to 22% by weight of alkyl acrylate or alkyl methacrylate having 6 or less carbon atoms. More particularly, the composition consists of 75 to 90% by weight of acrylic acid, 2.5 to 15% by weight of styrenesulfonic acid and 2.5 to 20% by weight of alkyl acrylate or alkyl methacrylate.

Most preferably, the composition consists of 80 to 90% by weight of acrylic acid, 3.5 to 10% by weight of styrenesulfonic acid and 3.5 to 10% by weight of alkyl acrylate or alkyl methacrylate.

Preferably, the alkyl acrylate of the present invention is at least one member selected from the group consisting of ethyl acrylate, propyl acrylate and butyl acrylate; and the alkyl methacrylate is at least one member selected from the group consisting of ethyl methacrylate, propyl methacrylate and butyl methacrylate.

It is preferred that the anionic, water-soluble copolymer has an average molecular weight of 50,000–500,000, preferably 100,000–300,000, when it is measured by using a gel permeation chromatography (molecular weight at exclusion limit of 2,000,000 (PEG)). In the anionic water-soluble copolymer of the present invention which usually contains 20% by weight of non-volatile components and which has a pH of 3.1, its viscosity will usually range preferably from 300 to 500,000 cps, more preferably from 400 to 5,000, when it is measured at 25° C. by using a Brookfield viscometer With the viscosity smaller than 300 cps, the emulsifying ability and the stability of the emulsion are not sufficient so that the particle size distribution becomes wide and the number of large particle is increased. With the viscosity greater than 5,000 cps, on the other hand, the viscosity during the capsule forming reaction and that of the capsule slurry obtained are too high, which is unsuitable for a pressure-sensitive recording sheet and the like in which a low viscosity is required.

Acrylic acid, styrenesulfonic acid, and the aimed anionic water-soluble copolymer of the present invention can be used in salt-free form or in the form of partial salt. Preferred examples of the salt include lithium salt, sodium salt, potassium salt, magnesium salt and calcium salt.

The procedure of the present invention is generally made as follows.

(1) Preparation of the core substance

The core substance of the capsules is prepared by using a hydrophobic solution as such or dissolving other materials in a hydrophobic solution, if necessary, under heating and stirring, (2) Production of the continuous phase The continuous phase is prepared by dissolving the anionic water-solube copolymer of the present invention in city water and then dissolving amine, aldehyde or polycondensate thereof as a capsule-forming material in the resultant solution.

As the above polycondensate, there may be used the polycondensate modified by phenols, benzoguanamine, and the like. The ratio of the wall-forming material to the core substance lies in a range between about 1:1 and 1:20 by solid-weight.

In the present invention, there may be used all sorts of amine, aldehyde and polycondensate which are dissolved in a continuous phase. The anionic water-soluble copolymer may be used in an amount of 0.5 to 7% by weight, preferably 1 to 5% by weight, based on the capsule-forming system, although the amount varies with the kind of anionic water-soluble copolymer, the starting material for forming the capsule walls, the kind of core material, the aim in the encapsulating process, and the like. Amine and aldehyde as a wall-forming substance in the present invention may be used alone or as prepolymer, if they are dissolved beforehand inthe continuous phase. The amine of the present invention includes a single substance selected from urea, thiourea, melamine, and $C_1$–$C_4$-alkylates thereof, methylolates thereof and $C_1$–$C_4$-alkylated methylolates thereof; or a mixture of at least two of them. it is preferable to use at least one of melamine, mthylolmelamine, methylated methylolmelamine, urea, dimethylolurea and methylated methylolurea.

Examples of the aldehyde include formaldehyde, paraformaldehyde, acetaldehyde, glyoxal, glutaraldehyde, methylglutaraldehyde, furfural and acrolein. Among them, formaldehyde is most preferable.

(3) Emulsification

Next, the core substance solution is added to the above-described continuous phase with stirring, and emulsification is performed using an emulsifier such as homogenizer, stationary mixer or the like. In general, it is preferable to perform the emulsification at room temperature or a lower temperature from the viewpoint of particle size distribution.

(4) Capsule Wall Forming Reaction

After obtaining emulsified particles of the prescribed particle size, the pH of the water solution is adjusted to one within the range where the used wall film forming materials are polycondensed. In general, this reaction should be carried out in the acid solution to form the finer wall film. The lower the pH is, the faster proceeds the reaction. However, the pH value should be adjusted to about 3 or above taking into consideration that the excessively rapid raction may be an obstacle to the formation of the uniform capsule wall.

The ratio of amine to aldehyde can not be determined, however, aldehyde is generally used in an amount of 0.6 to 5.0 moles per mole of amine. In an urea-formaldehyde resin, for example, formaldehyde is used preferably in an amount of 1.2 to 3.0 moles per mole of urea. After the emulsification, the aldehyde is added and simultaneously heated. The temperature will be raised to 35° to 90° C. Usually, however, the temperature is adjusted to 50° to 75° C. After a set temperature is reached, the temperature should be maintained for more than a predetermined period of time. If the temperature is set at 50°–60° C., those temperature should be maintained for at least one hour.

(5) After-treatment

After the encapsulating step, the control of temperature, the control of pH value, washing, filtration, drying, pulverizing and the like are carried out in accordance with the object of the capsules. In the use of formaldehyde, the excess amount of formaldehyde remaining in the capsule slurry should be reduced.

Although the details of the functions of the monomers are not clear, taking the state in the encapsulating step using each homopolymer into consideration, it is assumed as follows: The acrylic acid promotes both the emulsification and the reaction for forming capsule walls, but it has a less effect of decreasing large particles and offers a capsule slurry having a relatively high viscosity.

Styrenesulfonic acid has effects of increasing the emulsification rate, accelerating the formation of the capsule wall and decreasing the large particles. However, it tends to give the capsule wall film which is relatively hard and poor in impermeability.

Although alkyl acrylate or alkyl methacrylate does not accelerate the formation of the capsule wall, it has effects of improving the emulsification and dispersion powers and decreasing the large particles and gives the capsule slurry with a low viscosity.

In the use of hydroxyalkyl acrylate or hydroxyalkyl methacrylate instead of the alkyl acrylate or alkyl methacrylate, though it accelerates the formation of the capsule wall, it is inferior in emulsification and dispersion powers and shows an insufficient effect of decreasing the large particles. The properties of both the monomers are contrast to each other. Although both the monomers give the capsule slurries with low viscosities, the alkyl acrylate or alkyl methacrylate of the present invention is slightly lower in viscosity and its viscosity increases a little even with the rise of pH.

Further, in case that the carbon atoms of the alkyl group are 7 or above, the viscosity may increase greatly during the formation of the capsule wall, and the formation of the capsule wall may be imperfect or impossible.

It is thought that the anionic water-soluble copolymer of the present invention exerts the aforesaid effects only when the acrylic acid, styrenesulfonic acid and alkyl- acrylate or alkyl methacrylate having 6 or less carbon atoms are copolymerized.

[EXAMPLES]

The present invention is described by the Examples concerning with the microcapsules for a pressure-sensitive recording sheets. However, these Examples are intended to illustrate the invention, and the present invention is not limited to the microcapsules for pressure-sensitive recording sheets or these examples. Unless otherwise stated, parts or % are expressed as parts by weight or % by weight.

The viscosities, emulsifying ability (average particle diameter), particle size distribution, the number of large particles of the microcapsule slurries obtained in the below-mentioned Examples and Comparative Examples were measured in accordance with the following methods. These results are shown in Table 1.

(1) Viscosity: Viscosity of the capsule slurry was measured at 25° C. using a Brookfield Viscometer.

(2) Emulsifying ability: Indicated in terms of average particle diameter at an average volume, as measured using a particle-size measuring device, Coulter Counter Model TA-II (manufactured by Coulter Electronics Co., U.S.A.).

(3) Particle size distribution: Indicated by 10 times of logarithm of particle size ratio between a ploint of 25% volume and a point of 75% volume as measured by the particle-size measuring device, Coulter Counter Model TA-II. The small value means a small particle size distribution.

(4) Large particles: The number of the large particles is very small and hence can not measured by commercial particle size-measuring devices. The prepared capsule slurry is diluted to a half concentration by adding the city water and coated with a wire bar No. 22 on a lower sheet (W-50 BR produced by JUJO PAPER CO., LTD.), and dried. The degre of spots is expressed as number in 10×20 cm area, and th spots seen to based on large particle or secondary coagulation.

[EXAMPLE 1]

An anionic water-soluble copolymer consisting of 80 parts of acrylic acid, 10 parts of partial sodium salt of styrenesulfonic acid, and 10 parts of ethyl acrylate, and having 25 of non-volatile components and a viscosity of 1,150 cps (measured at 25° C. using a Brookfield viscometer), was synthesized. 28 parts of the anionic water-soluble copolymer were mixed with 72 parts of water and diluted. Further, 10 parts of urea and 12 parts of resorcinol were dispersed and dissolved An aqueous solution of caustic soda was added so that the pH was 3.4. Separately, to 14.8 parts of a high-boiling solvent composed chiefly of phenylxylylethane, 5.6 parts of Crystal Violet Lactone were added and dissolved under stirring while heated to about 90° C. After being dissolved, the solution was cooled to room temperature and was carefully mixed into an aqueous solution containing the above-prepared anionic water-soluble copolymeric mixture while paying attention to the phase invertion. The mixture was the mixed using a homomixer (manufactured by Tokushu Kiki Co.) at 9,000 rpm. After 10 minutes, particles a stable, o/w type emulsion having an average particle diameter of 3.5 microns was obtained. Thereafter, 27.5 parts of water for dilution and 23.5 parts of an aqueous solution containing 37% formaldehyde was added, and the mixture was heated until the temperature reached 55° C. The reaction for forming capsule walls was then continued for 2 hours. The capsule slurry was introduced in small amounts into the 20% aqueous solution of resorcinol, and shaken to observe the degree of capsule wall formation. No change was recognized (the capsule wall immediately exhibits a bluish color in case its degree of formation is insufficient), so a impermeable wall film had been formed. In order to reduce the amount of residual formaldehyde, the mixture was cooled to 40° C., and 28% ammonia water was added until the pH was 7.5 to thereby obtain capsule slurry for pressure-sensitive recording papers.

[EXAMPLES 2-5]

Capsule slurries were prepared by the same procedure as in Example 1 using four anionic water-soluble copolymers consisting of acrylic acid, partial sodium salt of styrenesulfonic acid and ethyl acrylate at different ratios.

[EXAMPLES 6-15]

Capsule slurries were prepared by the same procedure as in Example 1 using three anionic water-soluble copolymers consisting of acrylic acid, styrenesulfonic acid and propyl acrylate or n-butyl acrylate at different ratios.

[EXAMPLE 16-18]

Capsule slurries were prepard by the same procedure as in Example using three anionic water-soluble copolymers consisting of 80 parts of acrylic acid, 10 parts of styrenesulfonic acid, and 10 parts of ethyl methacrylate, or propyl methacrylate, or n-butyl methacrylate. As will be obvious from Table 1, the capsule slurries prepared by Examples 1-18 provide almost no large particles as spot-contamination, and are excellent in emulsifying ability, particle size distribution and slurry viscosity. Further, these slurries provide superior impermeability of capsule walls, as shown in Example 1.

The changes of the viscosity in storage were tested in the use of both the anionic water-soluble copolymer composed of 80 parts of acrylic acid, 10 parts of styrenesulfonic acid and 10 parts of ethyl methacrylate, in Example 16 of the present invention and the anionic water-soluble copolymer composed of 80 parts of acrylic acid, 10 parts of styrenesulfonic acid and 10 parts of hydroxyethyl methacrylate, in below comparative Example 7. The test results are as follows.

|  | Example 16 | Comparative Example 7 |
| --- | --- | --- |
| After production | 770 cps | 1,050 cps |
| After 3 weeks | 800 | 2,500 |
| After 2 months | 850 | 6,300 |
| After 6 months | 840 | 25,300 |

The anionic water-soluble copolymers of the present invention exhibit a slight change of viscosity with the lapse of time, and hence are stable and advantageous in the workability for forming microcapsules, as compared with the ydroxyl groupcontaining copolymer disclosed in Japanese Patent LaidOpen 68045/1985.

[EXAMPLE 19]

Anionic, water-soluble copolymer consisting of 85 parts of acrylic acid, 75 parts of styrenesulfonic acid, and 75 parts of n-butyl acrylate, and having 25% of non-volatile components and a viscosity of 900 cps (measured at 25° C. using a Brookfield viscometer), was synthesized. 28 parts of the anionic water-soluble copolymer were mixed with 28 parts of water and diluted. An aqueous solution containing 20% of caustic soda was added so that the pH was 4.0.

154 parts of hydrophobic solution of the same colorless dyestuff as that in Example 1 were added thereto, and emulsified in the same procedure as in Example 1 to obtain a stable o/w-type emulsion having an average particle diameter of 4.0 microns.

26 parts of aqueous methylated methylolmelamine solution (having 80% of non-volatile components; Uramine P6300) were added thereto. The reaction for forming capsule walls was then continued at 55° C. for 2 hours. The capsule slurry was introduced in small amounts into the aqueous solution of resorcinol, and shaken to observe the degree of capsule wall formation. No change was recognized, so an impermeable wall film had been formed. In order to reduce the amount of residual formaldehyde the solution was cooled to 40° C., 28% ammonia water was added until the pH was 7.5 to obtain capsule slurry for pressure-sensitive recording papers.

As will be obvious from Table 1, in the use of methylkated methylolmelamine resin as a wall-forming material, the capsule slurry prepared by using the anionic water-soluble copolymer of the present invention provides the same results as those in the use of urea-formaldehyde resin. That is, it exhibits less large particles, and it is excellent in emulsifying ability, particle size distribution and slurry viscosity.

[COMPARATIVE EXAMPLE 1]

Capsule slurry was prepared by the same procedure as in Example 1 using anionic, water-soluble copolymers consisting of 90 parts of acrylic acid and 10 parts of ethyl acrylate, and having 25% of non-volatile components and a viscosity of 1020 cps (measured at 25° C. using a Brookfield viscometer).

[COMPARATIVE EXAMPLES 2-6]

Capsule slurries were prepared by the same procedure as in Example 1 using five anionic, water-soluble copolymers consisting of 90 parts of acrylic acid, 10 parts of propylacrylate, n-butyl methacrylate, ethyl methacrylate, propyl methacrylate or n-butyl methacrylate.

The comparative Examples 1-6 containing no styrenesulfonic acid provide more than 5 times number of large particles as spot contaminant, more increase of viscosity during the capsule wall forming reaction in spite of the same capsulate viscosity of capsule slurries, which is undesirable for a capsule-forming process. Futher, comparative Examples exhibit a weak emulsifying ability and some what poor particle size distribution.

[Comparative Examples 7-9]

Capsule slurries were prepared by the same procedure as in Example 1 using anionic, water-soluble copolymers consisting of 90 parts of acrylic acid, 10 parts of styrenesulfonic acid, 10 parts of hydroxyethyl methacrylate, hydroxy-n-butyl methacrylate or hydroxyisobutyl methacrylate, and having 25% of nonvolatile components and a viscosity of 1050, 865 of 750 measured at 25° C. using a Brookfield viscometer, respectively.

These Comparative Example produce the capsules from the copolymers using hydroxyalkyl methacrylates in stead of alkyl methacrylates as a component of the anionic, water-soluble copolymer of the present invention.

As will be obvious from Table, these Comparative Examples are about equivalent in emulsifying ability, particle size distribution and slurry viscosity, as compared with Examples 16-18 of the present invention. However, these Comparative Examples provide more large particles and hence are inferior in this point. Further, as described in Examples 16-18, the anionic, water-soluble copolymers using hydroxyalkyl methacrylate have a disadvantage that they provide a prominent increase of viscosity as such with the lapse of time, which is undesirable for the capsule production.

[COMPARATIVE EXAMPLES 10-11]

Capsule slurries were prepared by the same procedure as in Example 1 using each of two anionic water-soluble copolymers: the copolymer consisting of 90 parts of acrylic acid, 5 parts of styrenesulfonic acid and 5 parts of octyl-acrylate, and having 25% of non-volatile components and a viscosity of 1250 cps (measured at 25° C. using a Brookfield viscometer), and the copolyer consisting of the 85 parts of acrylic acid, 10 parts of styrenesulfonic acid and 5 part of lauryl methacrylate and having 25% of non-volatile componds and a viscosity of 970 cps (measured at 25° C. using a Brookfield viscometer).

The good emulsification, excellent emulsification power and better distribution of emulsified particles were obtained. Although the viscosity was slightly increased during the encapsulating reaction, the gel was not formed.

The capsule slurry exhibits a bluish color when it was introduced in small amounts into 20% aqueous solution of resorcinol, and the bottom paper forms a blue color when it was coated with capsule slurry and was dried naturally. Therefore, a substantial capsule wall is not formed in case of hydrophobic core substance.

EFFECTS OF THIS INVENTION

The present invention comprises the use of the anionic, water-soluble copolymer described above in a process for producing microcapsules by the in-situ polymerization method wherein a microcapsule wall film composed of an amine-aldehyde polycondensate is formed by the reaction from only one side of the continuous phase.

TABLE 1

Test results of Examples

| Examples | Copolymer composition (% by weight) Acrylic acid % | Styrenesulfonic acid % | Acrylate | % | Copolymer Viscosity cps | Slurry Viscosity (25° C.) cps | Emulsifying ability (average particle diameter) μ | Particle size distribution width | Numbers of large particles | Remarks |
|---|---|---|---|---|---|---|---|---|---|---|
| 1 | 80 | 10 | EA | 10 | 1150 | 210 | 3.5 | 2.02 | 5 | |
| 2 | 80 | 5 | EA | 15 | 1270 | 255 | 3.3 | 2.09 | 7 | |
| 3 | 80 | 15 | EA | 5 | 1005 | 195 | 3.7 | 2.11 | 10 | slight secondary coagulation |
| 4 | 90 | 5 | EA | 5 | 1200 | 290 | 4.1 | 2.15 | 10 | slight secondary coagulation |
| 5 | 75 | 12.5 | EA | 12.5 | 955 | 250 | 2.9 | 2.08 | 5 | |
| 6 | 80 | 10 | PA | 10 | 960 | 185 | 3.2 | 2.05 | 7 | |
| 7 | 80 | 5 | PA | 15 | 1010 | 190 | 3.0 | 2.01 | 5 | |
| 8 | 80 | 15 | PA | 5 | 1200 | 210 | 3.9 | 2.07 | 5 | |
| 9 | 90 | 5 | PA | 5 | 890 | 170 | 3.9 | 2.17 | 10 | |
| 10 | 75 | 12.5 | PA | 12.5 | 880 | 220 | 2.7 | 2.09 | 6 | |
| 11 | 80 | 10 | n-BA | 10 | 920 | 235 | 3.0 | 2.00 | 1 | |
| 12 | 80 | 5 | n-BA | 15 | 790 | 160 | 3.1 | 2.13 | 2 | |
| 13 | 80 | 15 | n-BA | 5 | 870 | 170 | 3.3 | 2.15 | 6 | |
| 14 | 90 | 5 | n-BA | 5 | 1070 | 200 | 3.5 | 2.11 | 5 | |
| 15 | 75 | 12.5 | n-BA | 12.5 | 1050 | 180 | 2.6 | 2.15 | 4 | |
| 16 | 80 | 10 | EMA | 10 | 770 | 220 | 4.5 | 2.08 | 8 | |
| 17 | 80 | 10 | PMA | 10 | 1080 | 250 | 4.2 | 2.05 | 5 | |
| 18 | 80 | 10 | n-BMA | 10 | 1215 | 270 | 3.8 | 2.13 | 5 | |
| 19 | 85 | 25 | n-BA | 7.5 | 1045 | 150 | 4.0 | 2.10 | 10 | |

TABLE 2

Test results of Comparative Examples

| Comparative Example | Copolymer composition (% by weight) Acrylic acid | Styrenesulfonic acid % | Acrylate | % | Copolymer Viscosity cps | Slurry Viscosity cps | Emulsifying ability (average particle diameter) μ | Particle size distribution width | Number of large particles | Remarks |
|---|---|---|---|---|---|---|---|---|---|---|
| 1 | 90 | — | EA | 10 | 1020 | 260 | 4.8 | 2.41 | more than 50 | Prominent viscosity increase in capsule formation |
| 2 | 90 | — | PA | 10 | 910 | 250 | 4.3 | 2.43 | 35 | Prominent viscosity increase in capsule formation |
| 3 | 90 | — | n-BA | 10 | 840 | 215 | 4.0 | 2.45 | 27 | Prominent viscosity increase in capsule formation |
| 4 | 90 | — | EMA | 10 | 855 | 195 | 5.3 | 2.53 | more than 50 | some secondary coagulation |
| 5 | 90 | — | PMA | 10 | 900 | 180 | 5.1 | 2.51 | 27 | some secondary coagulation |
| 6 | 90 | — | n-BMA | 10 | 1140 | 230 | 4.5 | 2.47 | 25 | some secondary coagulation |
| 7 | 80 | 10 | HEMA | 10 | 1050 | 270 | 4.5 | 2.03 | more than 50 | some secondary coagulation |
| 8 | 80 | 10 | Hn-BMA | 10 | 865 | 235 | 4.1 | 2.01 | 35 | some secondary coagulation |
| 9 | 80 | 10 | Hi-BMA | 10 | 750 | 205 | 4.1 | 2.00 | 29 | some secondary coagulation |
| 10 | 90 | 5 | OA | 5 | 1250 | 820 | 3.7 | 2.72 | more than 50 | Prominent viscosity increase in capsule formation |
| 11 | 85 | 10 | LMA | 5 | 970 | 675 | 4.3 | 2.84 | more than 50 | insufficient wall impermeability |

EA: Ethyl acrylate
PA: Propyl acrylate
n-BA: n-Buthyl acrylate
OA: Octyl acrylate
EMA: Ethyl methacrylate
PMA: Propyl methacrylate
n-BMA: n-Butyl methacrylate
LMA: Lauryl methacrylate
HEMA: Hydroxyethyl methacrylate
Hn-BMA: Hydroxy-n-butyl methacrylate
Hi-BMA: Hydroxyisobutyl methacrylate The capsule slurry of the present invention has remarkably less large particles than that of the conventional process.

The present invention provides microcapsules being excellent in emulsification power, particle size distribution and viscosity of capsule slurry. The obtained capsule slurry has a low viscosity and hence is easy to handle in spite of high concentration. Therefore, a coating color having a high concentration is obtained easily and is applied on a substrate such as paper, efficiently. Further, the present invention has an additional advantage that the viscosity is not increased with the lapse of time due to the absence of hydroxyl group in an anionic, water-soluble polymer of the present invention.

We claim:

1. Process for producing microcapsules which use an aminoaldehyde resin as a capsule-wall comprising:
   preparing a hydrophobic core substance;
   preparing separately a continuous phase by dissolving an anionic water-soluble copolymer in water and then dissolving a capsule-forming material in the resultant solution;
   adding said core substance to said continuous phase while stirring to form an emulsion; and
   adjusting the pH of said emulsion to about 3–7.5;
   wherein said anionic water soluble copolymer consists of at least three monomers including acrylic acid, styrene-sulfonic acid, and alkylacrylate or alkylmethacrylate having alkyl group with at most 6 carbon atoms, in the absence of either or both of hydroxylalkylacrylate and hydroxyalkylmethacrylate; and said anionic water-soluble copolymer is used in an amount of 0.5–7.0% by weight, based on the capsuleforming system.

2. Process according to claim 1, wherein said anionic, water-soluble copolymer comprises 75–90% by weight of acrylic acid, 2.5–15% by weight of styrenesulfonic acid, and 2.5–20% by weight of alkylacrylate or alkylmethacrylate having alkyl group with at most 6 carbon atoms.

3. Process according to claim 1 or 2, wherein said alkylacrylate comprises at least one member selected from the group consisting of ethyl acrylate, propyl acrylate and butyl acrylate, or said alkylmethacrylate comprises at least one member selected from the group consisting of ethyl methacrylate, propyl methacrylate and butyl methacrylate.

4. Process according to claim 3, wherein said amine-aldehyde resin as capsule wall is a polycondensate of formaldehyde and at least one amine selected from the group consisting of melamine, methylolmelamine, methylated methylolmelamine, urea, dimethylol urea and methylated dimethylol urea, or a polycondensate of prepolymer of formaldehyde and at least said amine.

5. Process according to claim 4, wherein said amine-aldehyde resin is urea-formaldehyde polycondensate.

6. Process according to claim 1 or 2, wherein said amine-aldehyde resin as capsule wall is a polycondensate of formaldehyde and at least one amine selected from the group consisting of melamine, methylolmelamine, methylated methylolmelamine, urea, dimethylol urea and methylated dimethylol urea, or a polycondensate of prepolymer of formaldehyde and at least said amine.

7. Process according to claim 6, wherein said amine-aldehyde resin is urea-formaldehyde polycondensate.

8. Process according to claim 1 or 2, wherein said anionic, water-soluble copolymer comprises 80–90% by weight of acrylic acid, 3.5–10% by weight of styrenesulfonic acid, and 3.5–10% by weight of alkylacrylate or alkylmethacrylate having alkyl group with at most 6 carbon atoms.

9. Process according to claim 1, wherein said acrylic acid and/or said styrenesulfonic acid and/or said anionic water-soluble copolymer can be used in salt-free form or in the form of partial salt.

10. Process according to claim 9, wherein said salt is lithium, sodium, potassium, magnesium or calcium salt.

* * * * *